United States Patent
Ichihashi (12)

(10) Patent No.: US 6,337,111 B1
(45) Date of Patent: Jan. 8, 2002

(54) OPTICALLY ANISOTROPIC THIN FILM AND PROCESS FOR PRODUCING THE SAME

(75) Inventor: Mitsuyoshi Ichihashi, Shizuoka (JP)

(73) Assignee: Fuji PhotoFilm Co., Ltd., Kanagawa (JP)

( * ) Notice: Subject to any disclaimer, the term of this patent is extended or adjusted under 35 U.S.C. 154(b) by 0 days.

(21) Appl. No.: 09/292,738

(22) Filed: Apr. 16, 1999

(30) Foreign Application Priority Data

Apr. 16, 1998 (JP) .......................................... 10-106477

(51) Int. Cl.[7] .......................... C09K 19/60; C09K 19/04
(52) U.S. Cl. .................................... 428/1.31; 252/299.1
(58) Field of Search ........................ 252/299.01, 229.1, 252/582; 428/1.1, 1.31

(56) References Cited

U.S. PATENT DOCUMENTS 4,842,781 A  *  6/1989  Nishizawa et al. .......... 264/1.3
5,116,528 A  *  5/1992  Mullen et al. ............ 252/299.5
5,667,719 A  *  9/1997  Mortazavi et al. ..... 252/299.01
5,680,185 A  * 10/1997  Kobayashi et al. ........... 349/88
5,746,949 A  *  5/1998  Shen et al. .................. 252/585
5,751,389 A  *  5/1998  Andreatta et al. ............ 349/97
5,863,457 A  *  1/1999  Hasebe et al. ......... 252/299.01
6,124,907 A  *  9/2000  Jones et al. ................... 349/96
6,157,427 A  * 12/2000  Saynor et al. .............. 349/123

FOREIGN PATENT DOCUMENTS

EP     754962      *  1/1997
JP     9-297217    * 11/1997

* cited by examiner

*Primary Examiner*—Shean C. Wu
(74) *Attorney, Agent, or Firm*—Sughrue Mion, PLLC

(57) ABSTRACT

An optically anisotropic thin film comprising a dichroic dye which is cured while keeping prescribed orientation and a process for producing the same which comprises the steps of forming an orientation film of prescribed mode on a transparent or semitransparent substrate, applying a solution of a dichroic dye in a solvent to the orientation film, and fixing the orientation of the dichroic dye by evaporating the solvent from the dichroic dye solution.

6 Claims, 2 Drawing Sheets

OPTICALLY ANISOTROPIC THIN FILM AND PROCESS FOR PRODUCING THE SAME

FIELD OF THE INVENTION

This invention relates to an optically anisotropic thin film and a process for producing the same. More particularly, it relates to a thin film having light absorption anisotropy which is useful as a louver of displays, an optical filter of various laser apparatus, and the like and an economical process for producing the same.

BACKGROUND OF THE INVENTION

Systems having a function in attenuating, polarizing, scattering or shielding light including laser light and natural light have been used in a very broad range of applications, and there has been and will be an eager demand for these functions. These functions have been performed by the respective systems which operate through the respective mechanisms for the particular function. Accordingly, the products which perform the respective functions have been manufactured through the respective steps.

Such systems include those comprising an optical lens, a polarizing plate, etc. In recent years, photosemiconductors and liquid crystals have also been employed. For example, a film having a fine louver structure has been proposed, which is integrally sandwiched in between a pair of polycarbonate films to have a total thickness of about 1 mm and yet retains a louver effect. Devices having the above function are frequently used in the practice in combination with some mechanical mechanism.

Many of conventional devices used in the related art have a single function like the above-described film having a louver effect and do not perform a plurality of functions sufficiently. Apparatus which perform multiple functions need a large-sized optical system, an expensive semiconductor device or some special and expensive functional device. Further, these apparatus are not practical for mass production because of complicated steps involved. Besides, it has been very difficult to widen the area through which light is transmitted while securing uniformity in quality.

SUMMARY OF THE INVENTION

An object of the invention is to provide an optically anisotropic thin film showing anisotropy in light absorption characteristics which easily performs optical functions, such as attenuating, polarizing, scattering or shielding light including laser light and natural light.

Another object of the invention is to provide an economical process for producing such an optically anisotropic thin film.

The above objects are accomplished by (1) an optically anisotropic thin film comprising a dichroic dye which is cured while keeping prescribed orientation and (2) a process for producing the thin film comprising the steps of forming an orientation film of prescribed mode on a transparent or semitransparent substrate, applying a solution of a dichroic dye in a solvent to the orientation film, and fixing the orientation of the dichroic dye by evaporating the solvent from the dichroic dye solution.

The present invention provides an optically anisotropic thin film with which a function of attenuating, polarizing, scattering or shielding incident light including laser light can be performed with ease and a simple and economical process for producing the film.

DETAILED DESCRIPTION OF THE INVENTION

Figures 1A, 1B, 1C, 1D:
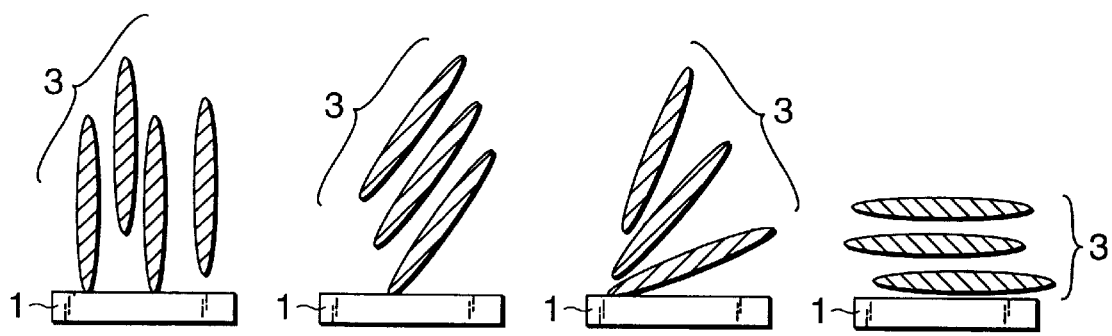
FIG. 1A–FIG. 1D show the structure of an optically anisotropic thin film according to the present invention in which dichroic dye molecules are orientated in four modes.

The thin film according to the present invention is usually supplied as provided on a substrate.

The film of the invention may have a single substrate on which the dichroic dye layer is formed or a pair of substrates in which the dichroic dye layer is sandwiched.

The substrate which can be used in the present invention is a transparent or semitransparent substrate made of glass, plastics, etc. A ready-made film having an optical function or action, a thin film having light absorption anisotropy or a semiconductor layer is also useful as a substrate.

The thin film of the invention can be formed by applying a solution of a dichroic dye in a solvent to an orientation film formed on the transparent or semitransparent substrate and fixing the orientation of the dichroic dye molecules by evaporating the solvent.

The orientation film can be formed on the substrate by applying a polymer, such as polyimide or polyvinyl alcohol (PVA), to the substrate followed by rubbing the coating film, treating the substrate with a silane coupling agent, or any appropriate combination of known treatments used for orientating liquid crystal molecules, such as polarized ultraviolet light irradiation, sputtering, fluidized treatment by shear force, oblique deposition of inorganic matter, and the like.

The dichroic dye solution can be applied to the orientation film by coating, spraying, dropping, and the like. If necessary, the orientation properties of the dichroic dye can be improved by temperature control.

After the application, the solvent is removed from the coating layer by evaporation to cure the film. If desired, ultraviolet radiation or heating may be applied for solvent removal.

The substrate may be stripped off the thus formed optically anisotropic thin film of the dichroic dye.

The dichroic dye which can be used in the invention includes anthraquinone dyes and azo dyes shown in Tables 1 and 2 below, respectively.

TABLE 1

| No. | Structural Formula |
|---|---|
| 1 | (anthraquinone derivative with OH, OH, O-C6H4-C7H15, NH2, OH, OH, O-C6H4-C7H15 substituents) |
| 2 | (anthraquinone derivative with OH, OH, O-C6H4-C4H9, NH2, OH, OH, O-C6H4-C4H9 substituents) |
| 3 | (naphthacenedione derivative with NH2, OH, and imide-N-C6H4-N(C4H9)(C10H21) substituents) |
| 4 | (anthraquinone derivative with NH-C6H4-C4H9, O-C6H4-C4H9, OH, OH, NH2, O-C6H4-C4H9 substituents) |
| 5 | (anthraquinone derivative with NH2, NH2, and COO-cyclohexyl-C8H17 substituents) |

| No. | Melting Point (°C.) | Max. Absorption Wavelength[*1] (nm) | Order Parameter S (Dichroic Ratio R) | Solubility (wt %) | Host Liquid Crystal[*2] | Maker |
|---|---|---|---|---|---|---|
| 1 | 170 | 595 (550) | 0.74 (9.5) | 3.5 | ZLI-1565 | Nippon Kayaku Co., Ltd. |
| 2 | 201–203 | 595 (550) | 0.73 (9.1) | 2.7 | ZLI-1565 | Nippon Kayaku Co., Ltd. |
| 3 | 160 | 612 | 0.72 (8.7) | 3.3 | GR-41 | Nihon Kanko Shikiso K.K. |
| 4 | 107–110 | 627 | 0.77 (11.2) | 5.0 | ZLI-1840 | Nippon Kayaku Co., Ltd. |
| 5 | — | 638 | 0.76 (11.8) | >5 | ZLI-1132 | Mitsubishi Chemical Industries, Ltd. |

TABLE 2

| No. | Structural Formula |
|---|---|
| 1 | 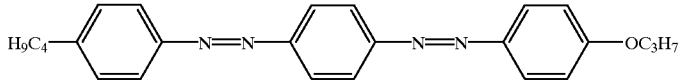 |
| 2 | 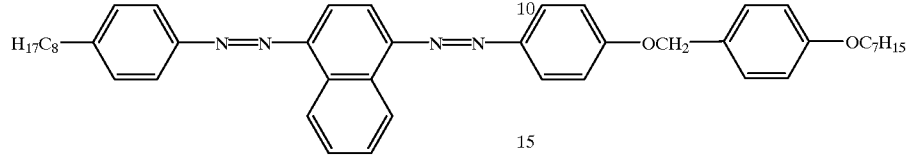 |
| 3 | 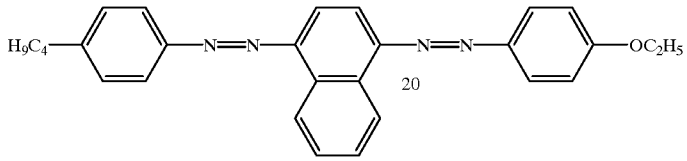 |
| 4 | 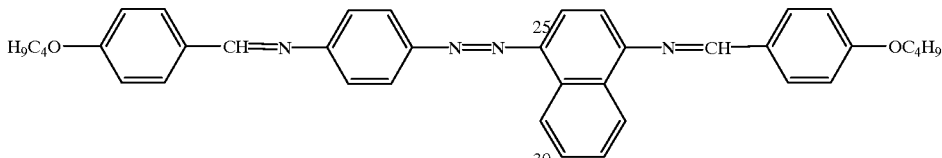 |
| 5 | 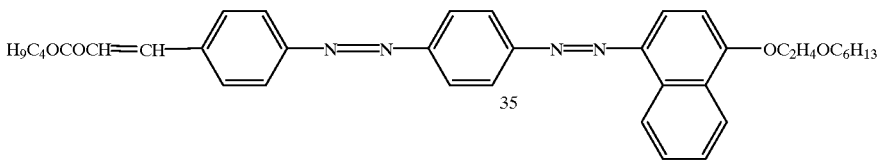 |
| 6 | 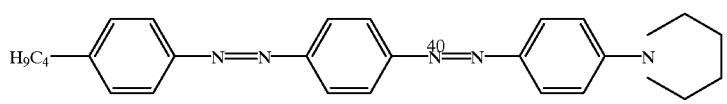 |

| No. | Melting Point (° C.) | Maximum Absorption Wavelength[*1] (nm) | Order Parameter S (Dichroic Ratio R) | Solubility (wt %) | Liquid Crystal[*2] | Maker |
|---|---|---|---|---|---|---|
| 1 | 139 | 398 | 0.75 (10.0) | 7.3 | GR-41 | Nihon Kanko Shikiso K.K. |
| 2 | — | 441 | 0.78 (11.7) | >3 | ZLI-1132 | Mitubishi Chemical Industries, Ltd. |
| 3 | 142 | 446 | 0.71 (8.4) | 3.1 | GR-41 | Nihon Kanko Shikiso K.K. |
| 4 | 142 | 450 | 0.79 (12.1) | 3.4 | GR-41 | Nihon Kanko Shikiso K.K. |
| 5 | — | 455 | 0.73 (9.0) | 2.6 | ZLI-1565 | Nippon Kayaku Co., Ltd. |
| 6 | 242 | 507 | 0.78 (11.4) | 2.6 | GR-41 | Nihon Kanko Shikiso K.K. |

Note:
[*1]Measured in liquid crystals.
[*2]ZLI-1132: produced by Merck & Co., Inc.; $T_{NI}$ = 70° C.
ZLI-1565: produced by Merck & Co., Inc.; $T_{NI}$ = 85° C.
GR-41: produced by Chisso Corp.; $T_{NI}$ = 70° C.
ZLI-1840: produced by Merck & Co., Ind.; $T_{NI}$ = 90° C.
E-8: produced by BDH; $T_{NI}$ = 70° C.

In addition, dichroic dyes having liquid crystal properties, rod-shaped dyes having a photo- or heat-crosslinking reactive group, disc-shaped liquid crystal dyes, photo- or heat-crosslinking liquid crystal molecules, j-association dyes, such as cyanin, and the like are also employable.

The embodiments of the practice of the invention are described with reference to FIG. 1, which shows the structure of an optically anisotropic thin film composed of substrate 1 and dichroic dye molecules 3 fixed thereon in four modes of orientation. In FIG. 1A, dichroic dye molecules 3 are orientated homeotropically with their major axis perpendicular to substrate 1 so that the film transmits a part or the whole of incident light without polarizing as such or while attenuating. This film is used as a louver, etc.

Dichroic dye molecules 3 in FIG. 1B are orientated with their major axis parallel with each other and making a certain angle with substrate 1. This film has a polarizing function to polarize incident light including laser light to a prescribed direction and is used as a louver, a reflecting or polarizing plate having spectral anisotropy.

In FIG. 1C, dichroic dye molecules 3 are orientated in a so-called hybrid mode with their major axis making various angles with substrate 1. This film has a light scattering function for scattering a part or the whole of incident light including laser light. It is used as a high-efficiency heat exchange layer for a recording device using a laser, a fluorescent dye, a reflective or polarizing plate having spectral anisotropy, a color filter, etc.

In FIG. 1D, the most or all of dichroic dye molecules 3 are orientated homogeneously with their major axis in parallel with substrate 1. The film has alight shielding function for shielding part or the whole of incident light including laser light and is useful as a polarized light shielding layer for a liquid crystal display, a high-efficiency heat exchange layer for a recording device using a laser, a fluorescent dye, a reflective or polarizing plate having spectral anisotropy, a color filter, etc.

The thin film shown in FIGS. 1A to 1D may be used as stripped off the substrate 1.

The present invention will now be illustrated in greater detail by way of Examples with reference to the accompanying drawings. Unless otherwise noted, all the percents are by weight.

EXAMPLE 1

An orientation film was formed on a glass substrate by applying PVA or polyimide (SE-150, produced by Nissan Chemical Industries, Ltd.), followed by rubbing. A 3% solution of a dichroic dye composition (NKX-1366, produced by Nihon Kanko Shikiso K.K.) in methyl ethyl ketone (MEK) was dropped on the orientation film, and the solvent was evaporated at room temperature to form an optically anisotropic thin film having a varied thickness. The dichroic dye in the film on either orientation film was found orientated.

Figure 2:
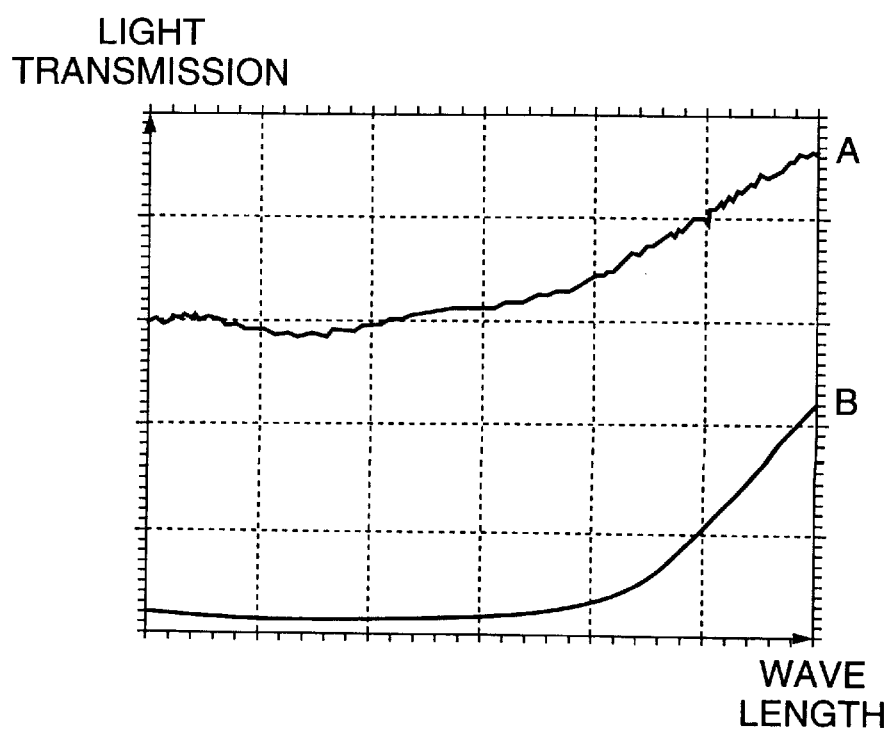
FIG. 2 is a graph of polarized light absorption spectra of the dichroic dye film prepared in Example 1.

The light absorption anisotropy of the orientated dye film formed on the polyimide orientation film (SE-150) with its thickness fixed and wavelength dependence of the light transmission of the film were measured using a polarizing microscope equipped with only an analyzer (the polarizer had been removed) in its transmission mode (objective magnification: 10) with a polarizing plate being inserted and a spectrometer (IMUC 7000; manufactured by ohtsuka Denshi K.K.). The polarized light absorption spectra obtained are shown in FIG. 2, in which the intensity of light transmitted through the substrate with the polyimide orientation film (with no dichroic dye film) and an analyzer is taken as 100%. Spectrum A is of the film in which the absorption axis of the dye is perpendicular to the polarizing direction of the polarizing plate, and spectrum B is of the film in which the absorption axis of the dye is in parallel with the polarizing direction of the polarizing plate. It is seen from FIG. 2 that the transmission is very low over the whole wavelength region where the axis of absorption of the dye and the polarizing direction of the polarizing plate are in parallel with each other, which indicates that the dye molecules are orientated in good order.

Figure 3:
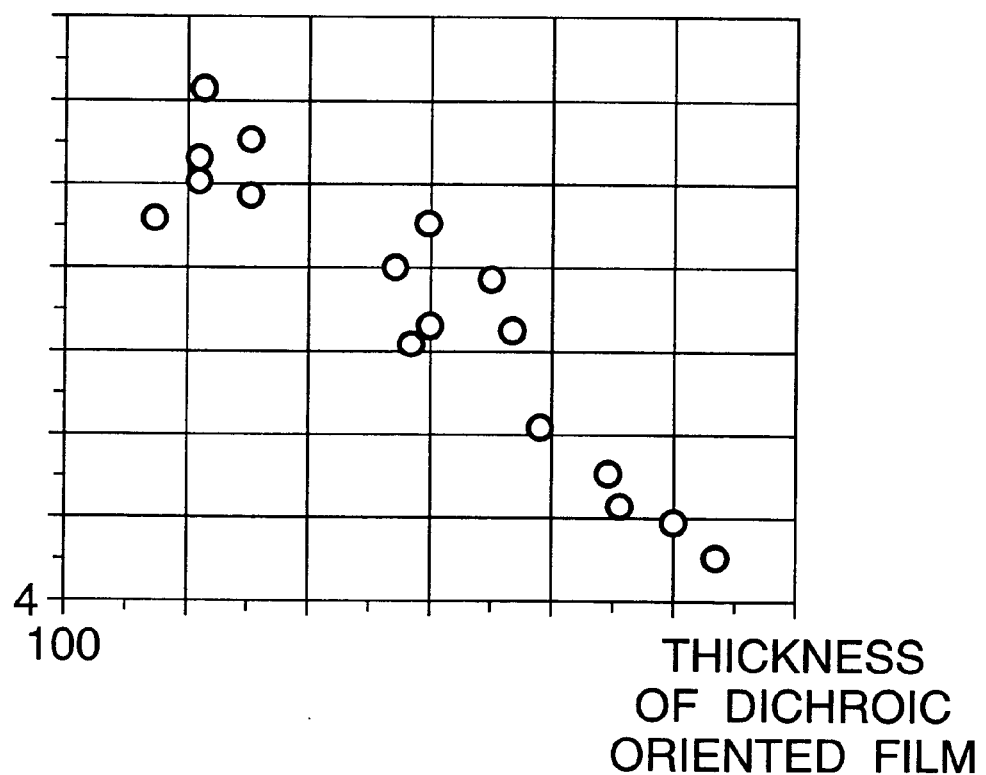
FIG. 3 is a graph of dichroic ratio (absorbance ratio) vs. thickness of the dichroic dye film prepared in Example 1.

FIG. 3 shows a graph of the thickness of the dichroic orientated film prepared above vs. the dichroic ratio (absorbance ratio) calculated from the light transmissions. It is seen that the dichroic ratio decreases with the increasing thickness of the film. This seems to be because the dye molecules are homogeneously orientated in the thin film as shown in FIG. 1D, while they are orientated in the mode shown in FIG. 1C in a thick film.

Observation of the above-described dye while heating under a polarizing microscope revealed that the dye exhibits a liquid crystal phase at 105° C. or higher.

EXAMPLE 2

A glass substrate was treated with a silane coupling agent (TSL-818, produced by Toshiba Corp.) for homeotropic orientation. A 1% solution of a dichroic dye composition (NKX-1366) in MEK was uniformly applied to the treated substrate by dropping, followed by evaporating the solvent to form a cured film.

The resulting thin film was found to have a schlieren texture under a polarizing microscope, lending confirmation to the formation of a film having an orientation mode close to those shown in FIGS. 1B or 1A.

While the invention has been described in detail and with reference to specific examples thereof, it will be apparent to one skilled in the art that various changes and modifications can be made therein without departing from the spirit and scope thereof.

What is claimed is:

1. An optically anisotropic thin film comprising a dichroic dye, which thin film is cured while the dichroic dye is kept in a prescribed orientation, wherein said dichroic dye is at least one compound selected from the group consisting of a rod-like dye or a disk-like dye having a photo- or heat-crosslinking reactive group, and a J-association dye, wherein said optically anisotropic thin film is prepared by forming an orientation film of prescribed mode on a transparent or semitransparent substrate, applying a solution of the dichroic dye in a solvent to the orientation film, and fixing the orientation of the dichroic dye by evaporating the solvent from the applied dichroic dye solution.

2. An optically anisotropic thin film according to claim 1, wherein said film is formed on a transparent or semitransparent substrate having been subjected to an orientation treatment by applying the dichroic dye to said substrate followed by curing.

3. An optically anisotropic thin film according to claim 1, wherein said dichroic dye has liquid crystal properties.

4. An optically anisotropic thin film according to claim 2, wherein the molecules of said dichroic dye are orientated with their axis of absorption parallel with each other and making an angle with said substrate.

5. A process for producing an optically anisotropic thin film comprising a dichroic dye, which thin film is cured while the dichroic dye is kept in a prescribed orientation, wherein said dichroic dye is at least one compound selected from the group consisting of a rod-like dye or a disc-like dye having a photo- or heat-crosslinking reactive group, and a J-association dye, comprising the steps of forming an orientation film of prescribed mode on a transparent or semitransparent substrate, applying a solution of the dichroic dye in a solvent to the orientation film, and fixing the orientation of the dichroic dye by evaporating the solvent from the applied dichroic dye solution.

6. A process according to claim 5, wherein the process further comprises the step of stripping off the thin film of the dichroic dye from the substrate.

* * * * *